US012597952B2

(12) United States Patent
Bharambe et al.

(10) Patent No.: US 12,597,952 B2
(45) Date of Patent: Apr. 7, 2026

(54) ANTENNA TUNING FOR WIRELESS LINKS

(71) Applicant: Google LLC, Mountain View, CA (US)

(72) Inventors: Vivek Tulshiram Bharambe, San Jose, CA (US); Jiang Zhu, Cupertino, CA (US)

(73) Assignee: Google LLC, Mountain View, CA (US)

( * ) Notice: Subject to any disclaimer, the term of this patent is extended or adjusted under 35 U.S.C. 154(b) by 542 days.

(21) Appl. No.: 17/908,130

(22) PCT Filed: Aug. 30, 2021

(86) PCT No.: PCT/US2021/048153
§ 371 (c)(1),
(2) Date: Aug. 30, 2022

(87) PCT Pub. No.: WO2023/033781
PCT Pub. Date: Mar. 9, 2023

(65) Prior Publication Data
US 2023/0387947 A1      Nov. 30, 2023

(51) Int. Cl.
H04B 1/04          (2006.01)
H04B 1/18          (2006.01)
H04B 1/3827      (2015.01)

(52) U.S. Cl.
CPC .............. H04B 1/0458 (2013.01); H04B 1/18 (2013.01); H04B 1/385 (2013.01)

(58) Field of Classification Search
CPC ........ H04B 1/0458; H04B 1/18; H04B 1/385; H04B 2001/3872
See application file for complete search history.

(56) References Cited

U.S. PATENT DOCUMENTS

2015/0305035 A1*  10/2015  Hu ...................... H04B 1/0458
                                                                    370/329
2016/0028375 A1      1/2016  Feldman et al.
(Continued)

FOREIGN PATENT DOCUMENTS

DE      102018103281 A1      8/2018
EP            2434652 B1 *  6/2015  ............... H03H 7/40

OTHER PUBLICATIONS

Office Action for Chinese Patent Application No. 202180017865.7 dated Oct. 1, 2024. 9 pages.
(Continued)

*Primary Examiner* — Umair Ahsan
(74) *Attorney, Agent, or Firm* — Lerner David LLP

(57) ABSTRACT

The disclosure is directed to a dynamic antenna tuning system for improving wireless links between a host device implementing the system, and one or more other devices. For example, the host device can be a smartwatch or other wearable device, and the other devices can be a pair of wireless earbuds or a smartphone. The antenna tuning system can use both an impedance tuner and an aperture tuner to dynamically tune an antenna based on both the impedance of an antenna at its feed and its radiation pattern. The system can tune the antenna and prioritize multiple wireless links for some devices connected to the host device, over others. The system adjusts tuning parameters in real-time and in response to changes in the connection strength of wireless links between the host device and one or more other devices, for example caused by movement of a user.

26 Claims, 7 Drawing Sheets

(56) References Cited

U.S. PATENT DOCUMENTS

| | | | |
|---|---|---|---|
| 2016/0126619 A1 | 5/2016 | Tenbroek et al. | |
| 2018/0342794 A1* | 11/2018 | Han | H04B 1/18 |
| 2018/0367177 A1 | 12/2018 | Ramasamy et al. | |
| 2019/0281597 A1 | 9/2019 | Ramasamy et al. | |
| 2019/0363428 A1 | 11/2019 | Zhu et al. | |
| 2020/0100121 A1* | 3/2020 | Cookman | H04B 1/18 |
| 2020/0245159 A1* | 7/2020 | Bezawada | H02J 3/02 |
| 2021/0218430 A1 | 7/2021 | Han et al. | |

OTHER PUBLICATIONS

International Search Report and Written Opinion for International Application No. PCT/US2021/048153 dated May 23, 2022. 15 pages.

* cited by examiner

500

Calculate next antenna performance metric when aperture tuner is set according to next tuning parameters. — 510

Next metric greater than stored metric? — 520

NO

YES

Update stored metric and tuning parameters. — 530

More tuning params? — 540

YES

NO

Output stored metric and tuning parameters. — 550

ANTENNA TUNING FOR WIRELESS LINKS

CROSS-REFERENCE TO RELATED APPLICATION

The present application is a national phase entry under 35 U.S.C. § 371 of International Application No. PCT/US2021/048153, filed on Aug. 30, 2021, the entire disclosure of which is incorporated herein by reference.

BACKGROUND

Portable electronic devices include one or more antennas for transmitting and receiving signals in various communication bands. Antenna design for small electronic devices, such as wearable devices, can be very challenging because of the constrained form factor of such devices. For example, while a smart phone may have limited space for housing its antennas, wearable devices such as smart watches and earbuds with compact form factors would necessarily have even less space. The limited space often impacts antenna performance, which may be measured by radiation efficiency and bandwidth. Antenna performance for wearable devices may also be severely impacted by body effects due to the close proximity to the body of a user wearing the device, which may cause detuning, attenuation, and shadowing.

Because portable electronic devices often have limited battery capacity, compensating for attenuated communication links between one device and another by increasing the transmission power of the antenna can severely reduce battery life and degrade the portability of the device. Battery drain is exacerbated when a portable device is in communication with other devices operated by the user, such as both earbuds and a smartphone.

BRIEF SUMMARY

Aspects of the disclosure are directed to a dynamic antenna tuning system for improving communication links between a host device, and one or more other devices. The antenna tuning system can be implemented across one or more of the host device and the one or more other devices. For example, the antenna tuning system can be implemented on the host device, which can be a smartwatch or other wearable device, and the other devices can be a pair of wireless earbuds or a smartphone. The antenna tuning system can use both an impedance tuner and an aperture tuner to dynamically tune an antenna, for example, based on both the impedance of an antenna at its feed and its radiation pattern. The system can tune the antenna and prioritize multiple communication links for some devices connected to the host device, over others. The system adjusts tuning parameters in real-time and in response to changes in the connection strength of communication links between the host device and one or more other devices.

In some examples, the antenna tuning system can use a single aperture tuner, without an impedance tuner, to adjust an antenna based on both the impedance of the antenna at its feed and its radiation pattern. In other examples, the antenna tuning system can use multiple aperture tuners, with or without an impedance tuner. The antenna tuning system can be implemented on devices with reduced complexity, for example on devices with only an aperture tuner but not an impedance tuner.

An aspect of the disclosure is directed to an antenna tuning system including an aperture tuner, an impedance tuner, and one or more processors, for example, including at least one aperture tuner, at least one impedance tuner, and one or more processors. The one or more processors can be configured to: generate a first antenna performance metric for a communication link between an antenna and a first device when the antenna is tuned according to one or more first tuning parameters, the first antenna performance metric based on an impedance metric for the antenna and a signal strength metric for the communication link. The one or more processors can update a tuning configuration for the antenna according to one or more second tuning parameters. The one or more processors can generate a second antenna performance metric for the communication link when the antenna is tuned according to the updated tuning configuration and using both the impedance tuner and the aperture tuner. The one or more processors can determine that the first antenna performance metric is higher than the second antenna performance metric, and in response revert the tuning configuration for the antenna according to the one or more first tuning parameters.

The technology described herein can provide for the following technical advantages: The antenna tuning system can improve the quality and reliability of communication links between a host device implementing the antenna tuning system, and one or more other devices. The system improves the performance of an antenna in maintaining a communication link, by basing the antenna performance metric on both an impedance metric for the antenna at its antenna feed and a signal strength metric of a communication link.

Instead of tuning separately for both impedance and signal strength, aspects of the disclosure provide for a tuning process in which antenna tuning by adjusting power delivery, for example through adjusting the impedance of the antenna at its feed, and adjusting the radiation pattern of the antenna, for example by tuning the antenna using an aperture tuner, to balance impedance and signal strength together. Not only does the antenna tuning system improve the quality of communication links through this combined tuning, but power consumption to a battery of the device can also be reduced, at least because less energy can be output for boosting the radiation pattern while maintaining comparable quality in communication link strength.

Updating the tuning configuration and reverting the configuration in response to determining that the first antenna performance metric is higher than the second antenna performance metric allows for simplifying the design and implementation of the antenna tuning system, without sacrificing accuracy. More complex circuitry or hardware is not needed to estimate or simulate the change in performance of an antenna with an updated tuning configuration, which may also be prone to error.

In addition to aspects of the disclosure described herein, aspects of the disclosure can include one or more of the following features. Some aspects of the disclosure include all of the following features in combination.

In updating the tuning configuration for the antenna the one or more processors can be configured to provide one or more tuning parameters to both the impedance tuner and the aperture tuner.

The technology described herein can provide for the following technical advantages: by balancing both aperture and impedance tuning and the signal strength of a communication link, the tuning system can improve cross-body communication between linked devices while consuming less energy from the often limited battery of a host device. In some examples, the tuning system can improve cross-body communication strength by 2-3 dB on average, which can yield 40-50% improvement in battery life versus other approaches. The antenna tuning system can achieve this by using a combination of impedance, aperture tuning, and the signal strength of different communication links to adjust the radiation pattern of the device antenna to point null zones away from devices in communication with the host device.

In generating the first antenna performance metric the one or more processors can be configured to compute the first antenna performance metric based on values for the imped-ance metric and the signal strength metric weighted accord-ing to predetermined weights.

The technology described herein can provide for the following technical advantages: The predetermined weights can adjust the relative contribution the values for the imped-ance metric and the signal strength metric have towards the overall antenna performance metric. The predetermined weights can improve performance of the antenna after tuning, at least because the weights can encode certain tuning preferences and design constraints unique to the host device. For example, the design of the host device, such as the materials used to build the host device, or the arrange-ment of the individual components within the host device, may motivate weight values for prioritizing improvements to impedance and/or signal strength, respectively. As also described herein, the predetermined weights can affect which devices coupled to the host devices are prioritized for their corresponding performance metric, over other devices.

The communication link can be a first communication link. The antenna can communicate with each of one or more second devices through a respective second communication link. In computing the first antenna performance metric the one or more processors can be configured to compute the first antenna performance metric further based on additional signal strength metrics each characterizing the signal strength of a respective second communication link weighted by a respective predetermined weight of the pre-determined weights.

The technology described herein can provide for the following technical advantages: Certain devices can be prioritized over other devices coupled to the host device to improve user interaction with the host device. For example, audio streaming devices may have larger predetermined weights to support antenna configurations leading to antenna performance metrics that are more heavily based on the respective impedance/signal strength metrics vis-à-vis com-munication with the audio streaming devices. In general, weighting metrics corresponding to connections among the host device and other devices communicating in a latency-intolerant circumstance, such as streaming audio or voice-call data, can be prioritized over other connections that may be more latency-tolerant, such as connections for transmit-ting push notification content between the host device and for example, a mobile device.

The impedance metric can be based on the S11 parameter for the antenna and the signal strength metric can be based on the received signal strength indicator (RSSI) of the communication link. The antenna can include an antenna feed. In generating the first antenna performance metric, the one or more processors can be configured to compute the first antenna performance metric in accordance with: $w_0(1-S_{11}*S_{11})+w_1(RSSI_1)$ where $w_0$ is a weight of the predeter-mined weights associated with the impedance metric, S11 is the reflection coefficient which depends on the impedance of the antenna at the antenna feed, $w_1$ is a weight of the predetermined weights associated with the first signal, and $RSSI_1$ is the signal strength of the communication link.

The technology described herein can provide for the following technical advantages: The predetermined weights can adjust the relative contribution the values for the imped-ance metric and the signal strength metric have towards the overall antenna performance metric. The predetermined weights can improve the performance of the antenna after tuning, at least because the weights can encode certain tuning preferences and design constraints unique to the host device.

In updating the tuning configuration the one or more processors can be configured to perform one or more itera-tions of: updating the tuning configuration of the antenna using respective one or more tuning parameters of a plurality of tuning parameters applied to the aperture tuner, the impedance tuner, or both the aperture tuner and the imped-ance tuner. The one or more iterations can also include generating a respective antenna performance metric when the tuning configuration is updated according to the respec-tive one or more tuning parameters. The one or more iterations can also include determining that the respective antenna performance metric is the highest antenna perfor-mance metric identified from the one or more iterations, and in response generating the respective antenna performance metric as the second antenna performance metric and updat-ing the tuning configuration according to the respective one or more tuning parameters for the highest antenna perfor-mance metric.

The technology described herein can provide for the following technical advantages: Iteratively updating the tuning configuration as described herein can improve the performance of the antenna tuning system in identifying the tuning configuration for the best antenna performance metric at a given point in time. As described herein, the antenna tuning system can perform a number of tuning checks periodically, in which the antenna tuning system searches for the tuning configuration with the highest corresponding performance metric. The antenna tuning system may per-form tuning checks more frequently in response to the ever-changing spatial relationship between the host device, like a smartwatch worn by a user, and one or more other devices, for example a pair of wireless earbuds. Quickly iterating through candidate tuning configurations allows for more frequent tuning checks in response to the potential changing circumstances between the linked devices requir-ing re-tuning of the antenna of the host device. For example, the tuning configurations can be iterated through on the order of milliseconds, for example about 100 milliseconds to iterate through 5-10 configurations, in some examples.

In generating the second antenna performance metric the one or more processors can be configured to adjust the value of a predetermined weight based on whether a communica-tion link corresponding to the signal strength value weighted by the predetermined weight is active or inactive.

The one or more processors can be further configured to: receive input indicating that at least one of the first com-munication link and the one or more second communication links are to be prioritized over other communication links. The one or more processors can be further configured to adjust the predetermined weights in accordance with the received input.

The technology described herein can provide for the following technical advantages: The indication received can be used to prioritize certain communication links, for example supporting latency-intolerant audio streaming between devices, over other communication links. Further, the indication can be received through user input or as part of a predetermined configuration from the device itself. Responding to the indication as described herein by adjusting the priority of communication links through respective adjustments to the predetermined weights can improve device connectivity, particularly in response to particular latency-tolerant and latency-intolerant use cases. Additionally, aspects of the disclosure provide for a flexible user interface for adjusting prioritization between different devices according to user preference, which can improve the user experience and consequently the performance of the host device in communicating along multiple communication links with other devices.

In updating the tuning configuration, the one or more processors can be configured to adjust both the impedance and the radiation pattern for the antenna.

The technology described herein can provide for the following technical advantages: Adjusting for both the impedance and the radiation pattern for the antenna can improve antenna performance while reducing energy consumption to the antenna from tuning by impedance alone. Tuning by impedance value alone can result in wasted energy at least because the resulting orientation and strength of the radiation pattern can be more efficient in maintaining a strong communication link.

The one or more processors can be further configured to: determine that a time for a tuning check has elapsed, and in response: generate the first antenna performance metric, update the tuning configuration for the antenna, generate the second antenna performance metric, and determine that the first antenna performance metric is higher than the second antenna performance metric.

In determining that the time for a tuning check has elapsed, the one or more processors can be configured to determine whether one or more of the antenna performance metric, the impedance metric for the antenna, and the signal strength metric for the communication link is below or above one or more predetermined thresholds.

In determining that the time for a tuning check has elapsed, the one or more processors can be configured to reduce the time to elapse for a tuning check based on one or more of the antenna performance metric, the impedance metric for the antenna, and the signal strength metric for the communication link falling below one or more predetermined thresholds.

The technology described herein can provide for the following technical advantages: Periodic antenna tuning can improve the quality of communication links between the host device and other devices, particularly when the subject devices are frequently moved and changed in orientation relative to one another. For example, the movement and orientation of a user wearing a host device, such as a smartwatch, and one or more other devices, such as a pair of wireless earbuds and/or a mobile phone, can change more frequently versus other circumstances in which antenna tuning may be necessary, for example to a stationary wireless base station in communication with devices not in the immediate vicinity of the base station. Because of the dynamic nature of the spatial relationship between devices, tuning checks can be timed so as to continuously allow for identification of updated tuning configurations based on newly measured antenna performance metrics.

Further, the tuning check period of time can be reduced when an antenna performance metric for a communication link falls below a predetermined threshold, which can provide for faster re-tuning of the linked antenna even before the time for a tuning check has elapsed. An antenna tuning system as described herein can cause the time for the tuning check to reduce regardless of the mobility or orientation status of the devices, for example as a wearable device versus a fixed base station, connected over the communication link.

The one or more processors can be further configured to receive one or more weights of the predetermined weights as input from a user or from an application installed on a computing device implementing the antenna tuning system.

Other aspects of the disclosure include computing devices implementing the antenna tuning system, for example, wearable computing devices, methods performed by one or more processors, and computer readable storage media, including non-transitory computer readable storage media storing instructions, which when performed by one or more processors, cause the one or more processors to perform the operations of one or more methods described herein. Other aspects can include one or more of the foregoing optional features, in any of a variety of different combinations.

In some examples, the disclosure is directed to a dynamic antenna tuning system for improving wireless links between a host device implementing the system, and one or more other devices. For example, the host device can be a smartwatch or other wearable device, and the other devices can be a pair of wireless earbuds or a smartphone. In other examples, the dynamic antenna tuning system can be at least partially implemented on the host device, and at least partially implemented on the one or more other devices. The antenna tuning system can use both an impedance tuner and an aperture tuner to dynamically tune an antenna based on both the impedance of an antenna at its feed and its radiation pattern. The system can tune the antenna and prioritize multiple wireless links for some devices connected to the host device, over others. The system adjusts tuning parameters in real-time and in response to changes in the connection strength of wireless links between the host device and one or more other devices, for example caused by movement of a user.

An aspect of the disclosure is directed to an antenna tuning system including one or more aperture tuners, and one or more processors. The one or more processors can be configured to: generate a first antenna performance metric for a communication link between an antenna and a first device when the antenna is tuned according to one or more first tuning parameters, the first antenna performance metric based on an impedance metric for the antenna and a signal strength metric for the communication link. The one or more processors can update a tuning configuration for the antenna according to one or more second tuning parameters. The one or more processors can generate a second antenna performance metric for the communication link when the antenna is tuned according to the updated tuning configuration and using one or more aperture tuners. The one or more processors can determine that the first antenna performance metric is higher than the second antenna performance metric, and in response revert the tuning configuration for the antenna according to the one or more first tuning parameters.

The antenna tuning system can include multiple aperture tuners and multiple antennas, each antenna tuned according to a respective aperture tuner in a respective tuning state. The one or more processors are further configured to update a respective tuning configuration for each antenna.

The technology described herein can provide the following technical advantages: the antenna tuning system implemented on a device with one or more aperture tuners can use available tuners on devices of reduced hardware complexity, for example a device with aperture tuners but no impedance tuners. In these examples, the antenna tuning system can adjust for both the impedance and the radiation pattern so the antenna can improve antenna performance while reducing energy consumption to the antenna from tuning by impedance alone. The antenna tuning system can change the state of the one or more aperture tuners, which changes both the impedance value and radiation pattern of the antenna.

DETAILED DESCRIPTION

Overview

Figure 1:
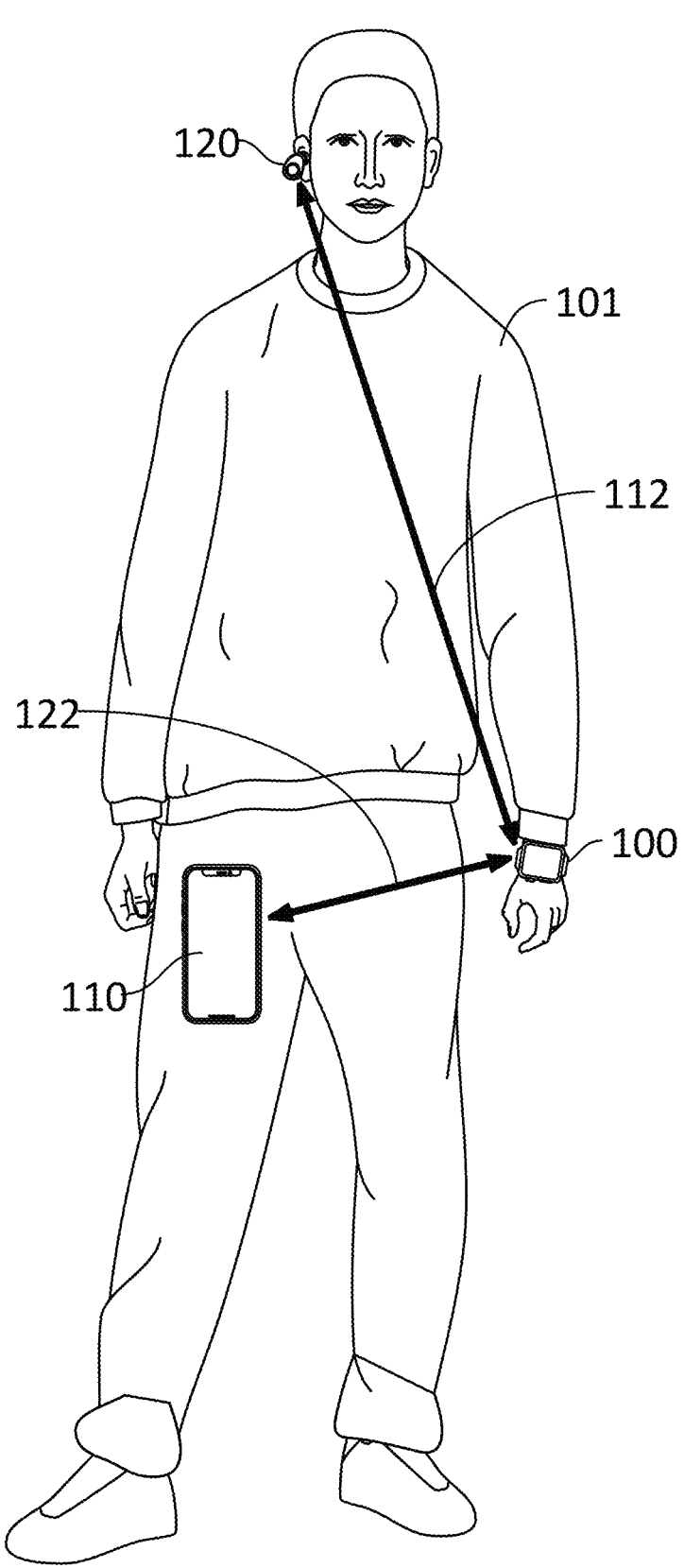
FIG. 1 is an illustration of a user of a host wearable device coupled to two other devices through respective communication links.

Aspects of the disclosure are directed to an antenna tuning system on a device having a small form factor, such as a smart watch or a mobile phone. The antenna tuning system can dynamically tune a device antenna using both impedance and aperture tuning. The antenna tuning system identifies tuning parameters for improving the quality of a communication link between the host device and another device, such as a wearable device. The antenna tuning system tunes according to both the impedance of the communication link and the signal strength of a communication link, to tune the antenna more efficiently than tuning by impedance alone.

For small devices, including devices with small form factors and particularly for wearable devices and devices carried close to the body of a user, antenna placement and tuning is often limited by several factors, such as the limited space available within the device and the limited battery capacity of small-device batteries. Environmental factors, such as the electromagnetic environment between the communicating devices, can also affect the performance of an antenna in certain devices. Additional factors can include cross-body interference between different devices, for example, earbuds and smartwatch, smartwatch and phone, phone and earbuds, etc., operated or worn by a user. Cross-body interference can include interference in the communication link between communicating devices caused by physical interference of the body of the user. For example, the quality of the communication link between a pair of earbuds and a smartwatch worn by a user may be at least partially diminished based on the orientation and position of the user's body.

The antenna tuning system can be implemented on a device, referred to as a host device in this specification. In other examples, the antenna tuning system may be implemented on one or more client devices, such as one or more other devices that are not designated as a host device. The antenna tuning system can communicate with one or more antennas across one or more client devices and/or a host device, according to aspects of the disclosure described herein. The tuning system tunes one or more antennas of the system to communicate with one or more devices linked to the host device. The tuning system can include an impedance tuner and an aperture tuner. The host device maintains a respective communication link with each of one or more other devices. For example, the host device can be a smart watch, maintaining a first link to one or both earbuds of a pair of wireless earbuds, and a second link to a mobile device, such as a smartphone.

Aspects of the disclosure provide for a number of technical advantages. By balancing aperture and impedance tuning and the signal strength of a communication link, the tuning system can improve cross-body communication between linked devices while consuming less energy from the often limited battery of a host device. In some examples, the antenna tuning system can improve cross-body communication strength by 2-3 dB on average, which can yield 40-50% improvement in battery life versus other approaches. The antenna tuning system can achieve this by using a combination of impedance, aperture tuning, and/or the signal strength of different communication links to adjust the radiation pattern of the device antenna to point null zones away from devices in communication with the host device.

Reduced battery consumption can also help to mitigate thermal issues on the host device. For example, the antenna tuning system reduces the need to increase signal power to compensate for weak communication links, which would otherwise contribute to increased thermal dissipation. More reliable communication links can also result in improved throughput and reduced packet loss, which can be particularly important for audio streaming or real-time audio calls, in which even minor packet loss or delays can severely impact user experience. Further, the antenna tuning system is adaptable to different materials used to house components of a host device and to bind the device to one or more device accessories and/or to a user. In other words, the antenna tuning system can improve antenna signal quality without pre-configuration, even in proximity to different device accessories, such as device cases, watch bands, etc., made of different materials, such as metal, rubber, and/or leather.

In addition, the antenna tuning system as described herein can tune the radiation pattern of an antenna using an aperture tuner, without the use of an antenna diversity switch, multiple antennas with phase shifters, or parasite elements. In this way, the antenna tuning system can reduce the number of additional components required by a host device implementing the system, which can further improve energy efficiency and allow for smaller form factors in the design of the host device.

Aspects of the disclosure can be implemented for a wide variety of different small form-factor devices, and across different architectures and designs for aperture tuners and impedance tuners, including devices with a combination of both aperture tuners and impedance tuners, as well as devices with one or more aperture tuners, and devices with one or more aperture tuners and no impedance tuners. This flexibility in implementation can help with successive design iterations of different small form-factor devices, at least because the antenna tuning system itself does not impose strict hardware design requirements.

Example Systems

FIG. 1 is an illustration of a user 101 of a host device 100 implementing an antenna tuning system, according to aspects of the disclosure. As illustrated in FIG. 1, the host device 100 is a smartwatch. Device 110 is a smartphone and device 120 is a wireless earbud. The host device 100 and devices 110, 120 shown in FIG. 1 are illustrative of only one possible combination of host devices and other devices. In practice, the host device and other devices could include any combination of small form factor devices. Communication link 112 (represented as a double-sided arrow between the device 120 and the host device 100) can be a wireless connection between the devices 100, 120. The devices 100, 120, can be configured to communicate data back-and-forth across the communication link 112. Communication link 122 (represented as a double-sided arrow between the device 110 and the host device 100) can also be a wireless connection between the devices 100, 110. In some examples, both communication links 110, 112 are active at once, meaning that data is transmitted to-and-from the host device 100 and one of the devices 110, 120. For example, the host device 100 can stream audio data, for example music or an audio message, to the device 120, while receiving messages, such as text messages, from the device 110.

Figure 2:
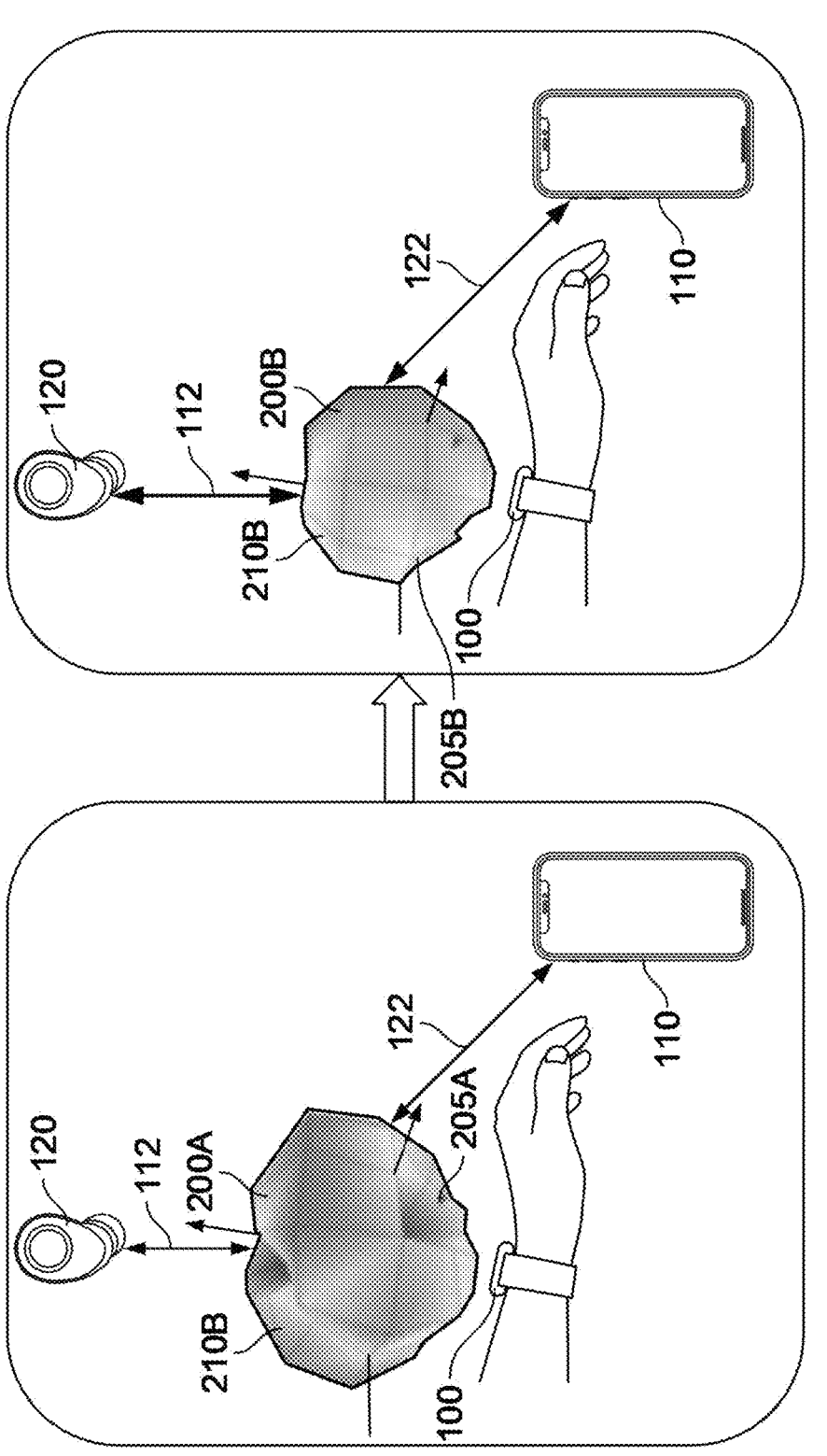
FIG. 2 illustrates an initial antenna radiation pattern before tuning by the example antenna tuning system and a tuned antenna radiation pattern after tuning by the example antenna tuning system

FIG. 2 illustrates an initial antenna radiation pattern before tuning by the example antenna tuning system and a tuned antenna radiation pattern after tuning by the example antenna tuning system. The host device 100 emits a radiation pattern during operation, for example, as shown by the initial radiation pattern 200A. The radiation pattern corresponds to the radio waves emitted by the host device, for example, through one or more antennas, and the radio waves can vary in strength across the pattern. The initial radiation pattern 200A has a particular geometry and orientation, and in this example includes null zones 205A-B.

A null zone can refer to a direction in a radiation pattern in which little to no radio signal is emitted by the host device. Null zones can appear for a variety of different reasons, including, but not limited to, the type of antenna, for example a monopole antenna, a slot antenna, etc., and the electromagnetic environment in which the radiation pattern is present, for example an environment affected by user pose, body size of the user, user activity, such as running versus standing still, etc. In the context of wearable devices, null zones can often appear at different parts of a radiation pattern as the user of the devices 100, 110, 120, moves around. Null zones may move around in the radiation pattern as the radiation pattern itself changes. The radiation pattern may change as a result of different factors, such as changes in the orientation of the device and/or the orientation of a user's body wearing the device. Not only does the position of the devices 100, 110, and 120 change in relation to one another, for example while the user moves or changes position, but the body of the user itself can cause interference leading to null zones appearing across the initial radiation pattern 200A. Null zones are of particular concern in the context of radiation patterns for antennas of wearable devices, because of the rapidly changing spatial relationship between the various devices 100, 110, 120.

As shown in FIG. 2, the null zones 205A-B are pointed towards devices 110, 120 in communication with a host device 200. As a result, the communication links 112, 122 are substantially weakened and prone to failure, such as by dropping packets of data transmitted between devices. While the transmission power of the antenna for the host device can be increased to overcome the weakened communication links, this approach is untenable in the context of a wearable device with limited battery power, as with the example host device 100. Further, the dynamically changing relationship in position between the devices undermines any performance gain caused by raw power transmission increase, for example because devices on the other end of the communication link may move away relative to the host device and no longer be in the direction of the transmitted signal.

Aspects of the disclosure provide for an antenna tuning system that tunes an antenna with both an impedance tuner and an aperture tuner, and based on an antenna performance metric combining both the impedance of an antenna at an antenna feed, with the signal strength of a communication link.

For example, after tuning the antenna of the host device using the antenna tuning system as described herein, the initial radiation pattern 200A shifts to the tuned radiation pattern 200B. The tuned radiation pattern 200B has shifted in both intensity and orientation, reflecting changes to the radiation pattern caused by both impedance and aperture tuning, together. The null zones 205A-B in the tuned radiation pattern 200B are shifted away from the devices 110, 120, improving the signal strength of the corresponding links between the device 110, 120 and the host device 100. The tuned radiation pattern 200B also requires less power to maintain, as shown in the comparison of sizes between the radiation patterns 200A, B, as shown in FIG. 2. Despite less power drawn by the antenna, the communication links 112, 122 are improved, for example by reducing or eliminating dropped packets of data transmitted over a respective communication link.

Figure 3:
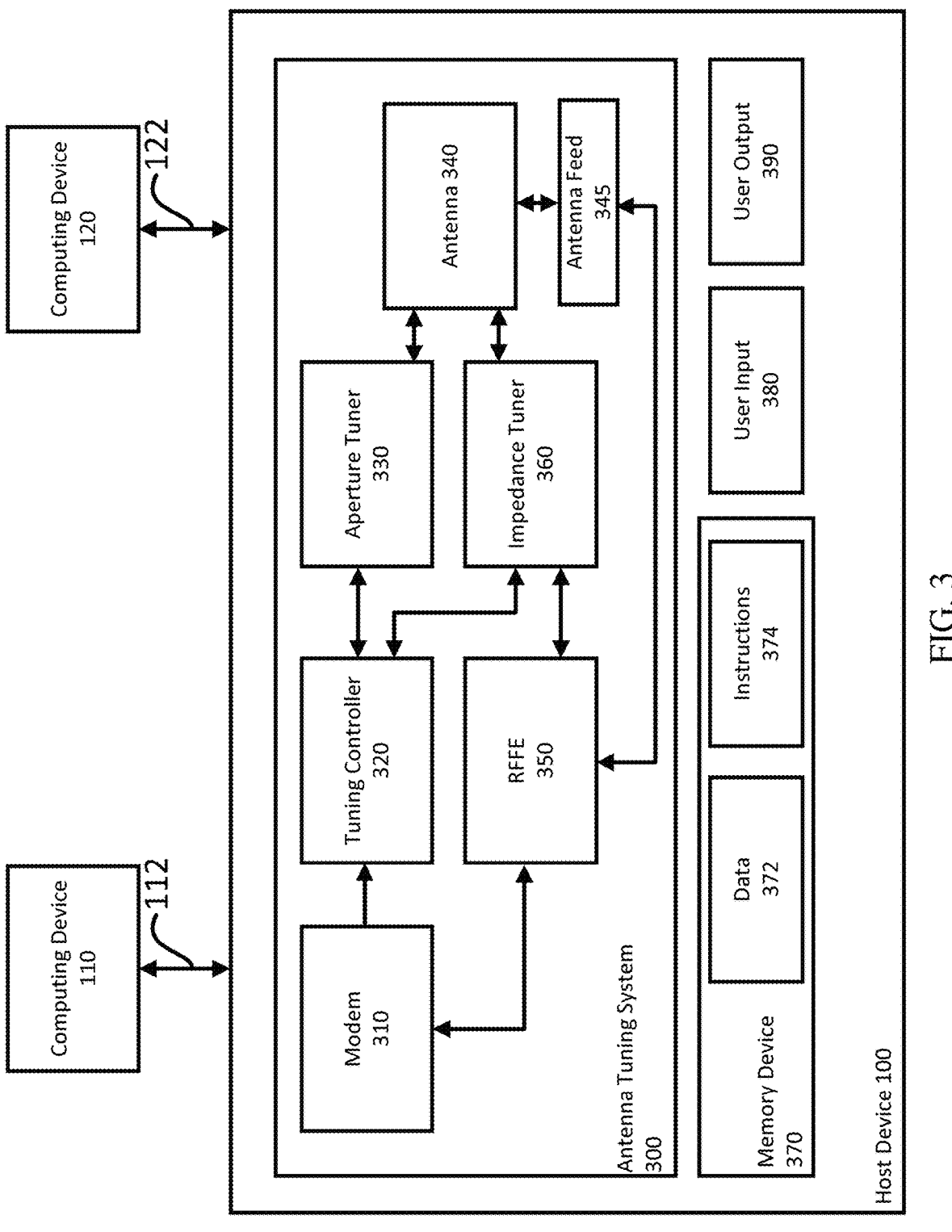
FIG. 3 is a block diagram of an example antenna tuning system, according to aspects of the disclosure.

FIG. 3 is a block diagram of an example antenna tuning system 300, according to aspects of the disclosure. The system 300 can include a modem 310, a tuning controller 320, an aperture tuner 330, an antenna 340, a radio frequency front end (RFFE) 350, and an impedance tuner 360. The modem 310, the tuning controller 320, and RFFE 350 can be configured as one or more digital circuits configured to perform operations as described herein. The digital circuits can include one or more processors, such as a combination of cone or more central processing units, microprocessors, digital signal processors, embedded processors, microcontrollers, field-programmable gate arrays (FPGAs), and other specialized circuits, such as application specific integrated circuits (ASICs). As described herein and with reference to FIGS. 3 and 4, the tuning controller 320 can be configured to perform operations for tuning one or more communication links based on the impedance value of the antenna 340 and the signal strength of each communication link between the host device 100 and one or more other devices.

The antenna tuning system 300 can be implemented on a computing device, such as the host device 100 described herein with reference to FIG. 1. Each of the modem 310, tuning controller 320, and/or the RFFE 350 can be communicatively coupled, for example through wires or collectively integrated on a control board, with a memory device 370. The memory device 370 can be a combination of volatile and non-volatile memory. The memory device 370 can include one or more sources of memory, for example as separate components of the host device 100 and/or implemented on devices different than the host device 100 and in communication with the host device 100 over a communication link. For example, the memory device 370 can include any type of non-transitory computer readable medium capable of storing information, such as a harddrive, solid state drive, memory card, ROM, RAM, cache memory, write-capable, and read-only memories.

The memory device 370 can store data 372 and instructions 374. The memory 370 can store information accessible by other components of the host device 100, such as modem 310, the tuning controller 320, and/or RFFE 350, including the instructions 374 that can be executed by the modem 310, the tuning controller 320, and/or RFFE 350. The memory 314 can also include data 323 that can be retrieved, manipulated or stored by the modem 310, the tuning controller 320, and RFFE 350.

The instructions 374 can include one or more instructions that when executed by the tuning controller 320, causes the tuning controller 320 to perform actions defined by the instructions. The instructions 374 can be stored in object code format for direct processing by the antenna tuning controller 320, or in other formats including interpretable scripts or collections of independent source code modules that are interpreted on demand or compiled in advance. The instructions 321 can include instructions for implementing components of the system 100 consistent with aspects of this disclosure.

The data 323 can be retrieved, stored, or modified by the processor(s) 313 in accordance with the instructions 321. The data 323 can be stored in computer registers. The data 323 can also be formatted in a computer-readable format such as, but not limited to, binary values, ASCII or Unicode. Moreover, the data 323 can include information sufficient to identify relevant information, such as numbers, descriptive text, proprietary codes, pointers, references to data stored in other memories, including other network locations, or information that is used by a function to calculate relevant data.

The host device 100 can be configured for receiving user input and/or generating user output. The host device 100 can include a user input 380, and a user output 390. The user input 380 can include any appropriate mechanism or technique for receiving input from a user, such as mechanical actuators, soft actuators, touchscreens, microphones, and sensors. The host device 100 can be configured to display at least a portion of the received data on a display implemented as part of the user output 390. The user output 326 can also be used for displaying an interface between the host device 100 and one or more other devices, such as the devices 110, 120. The user output 326 can alternatively or additionally include one or more speakers, transducers or other audio outputs, a haptic interface or other tactile feedback that provides non-visual and non-audible information to a user of the host device 100.

The modem 310 can be configured for receiving signals at different radio frequency (RF) bands, and translating the signals to a format that can be processed by the host device 100.

In some implementations, the host device 100 includes multiple antennas, including the antenna 340. Each antenna can be configured for receiving and transmitting signals at different RF bands. For example, the host device 100 can include separate antennas for supporting a variety of short- and long-range connections. In addition or alternatively, the host device 100 includes at least one antenna configured to support one or more types of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); 13.56 MHz (commonly associated with the Near Field Communication (NFC) standard); or with a variety of communication standards, such as the LTE® standard for wireless broadband communication, or for communicating with global navigation satellite systems (GNSS), such as the Global Positioning System (GPS). Each antenna can be coupled to a respective aperture tuner and impedance tuner. In some examples, each antenna can have its own one or more aperture tuners, and one or more impedance tuners. In some examples, at least one antenna can have one or more aperture tuners, without impedance tuners. In other examples, at least some of the aperture tuners and impedance tuners of the antenna tuning system 300 are configured to tune multiple antennas The modem 310 can be configured to measure and/or receive values at least partially characterizing the antenna 340, including communication links between the antenna 340 and antennas for one or more other devices, for example the devices 110, 120 described herein with reference to FIG. 1. The values can include an impedance metric for the antenna, as well as a signal strength metric for a communication link between the antenna of the host device and the antenna of another device.

The modem 310 can measure the impedance metric at an antenna feed 345 for the antenna 340. The impedance metric can be an S11 parameter representing the reflection coefficient, which depends on the impedance of the antenna 340 at the end antenna feed 345. The signal strength metric can be a received signal strength indicator (RSSI) characterizing the signal strength of a communication link, such as the communication link 112 or 122, between the host device and one or more other devices. In some examples in which the host device 100 is connected to multiple other devices, the modem 310 is configured to separately measure the signal strength for each communication link.

The RFFE 350 can include a number of components (not shown) for receiving and transmitting signals at different RF bands. For example, the RFFE 350 can include an RF filter and an amplifier for filtering and amplifying signals received and transmitted by the RFFE 350. The RFFE 350 can receive and transmit signals over a variety of different frequencies, for example as described herein.

The antenna 340 can be any of a variety of different types of antennas, such as a monopole antenna, a dipole antenna, a planar antenna, a slot antenna, a hybrid antenna, a loop antenna, an inverted-F antenna, etc. The antenna 340 can be made of any of a number of conductive materials, for example, different metals or alloys.

The aperture tuner 330 can be configured to adjust the radiation pattern of the antenna 340. For example, the aperture tuner 330 can be positioned on the antenna body such that the same antenna can be designed to support multiple distinct radiation patterns. For example, on an inverted-F antenna, the aperture tuner 330 can be positioned right next to the feed or further from the feed. The aperture tuner 330 can have different switch states to use these patterns. As described in more detail with reference to FIGS. 3-5, the antenna tuning system 300 uses both the aperture tuner 330 and the impedance tuner 360, as well as performance characteristics of the antenna 340, to improve communication links between the host device 100 and the other devices 110, 120.

The aperture tuner 330 can be configured to have a number of preset configurations, each corresponding to a respective tuning code. The aperture tuner 340 can include an aperture tuning controller and can be configured to adjust to one of the preset configurations, in response to receiving a tuning code from the tuning controller 320. As described in more detail with reference to FIGS. 4-5, the tuning controller 320 can iteratively provide each of a number of tuning codes to the aperture tuner 330, and compare respective performance characteristics for the antenna 340 under each configuration. The aperture tuner 340 is said to be in a respective aperture tuning state when tuning the antenna 340 according to a respective tuning code.

The impedance tuner 360 can be configured to adjust the impedance of the antenna 340. The impedance tuner 360 can identify one or more tuning values for tuning the antenna 340 to arrive at a desired impedance value. For example, the impedance tuner 360 can include one or more matching networks, open loop, and/or feedback-based impedance matching circuit for matching the impedance value of the antenna 340 with the impedance value for the RFFE 350. The impedance tuner 360 can be in one of any number of impedance tuning states, based on different possible tuning values. The impedance tuner 360 can be configured to automatically tune the antenna 340 whenever detecting a mismatch in the impedance of the antenna 340 and the impedance of the RFFE 350.

The impedance tuner 360 and the aperture tuner 330 can be implemented in a number of different ways. As shown in FIG. 3, the aperture tuner 330 and the impedance tuner 360 can be implemented as separate components, with the impedance tuner 360 configured to adjust signal reflections at the antenna feed, while the aperture tuner 330 is configured to adjust the radiation pattern towards the secondary computing devices 110 and/or 120. In some examples, the impedance tuner 360 is fixed with an impedance match at the antenna feed 345. In these examples, the overall hardware complexity can be reduced, and the aperture tuner 360 can be configured for adjusting the radiation pattern towards the secondary computing devices 110 and/or 120, as well as ensuring an on-going impedance match at the antenna feed 345.

In some examples, the antenna tuning system 300 includes one or more aperture tuners, such as the aperture tuner 330, and does not include an impedance tuner. In those examples, the tuning controller 320 can use only the one or more aperture tuners, based on balancing both an impedance value and a signal strength metric for a communication link. Even without an impedance tuner, in some cases variations in how the aperture tuner 330 tunes the antenna 340 can affect both the radiation pattern of the antenna 340 as well as an impedance value for the antenna feed 345.

In some examples, the antenna tuning system 300 includes multiple aperture tuners 330. Each aperture tuner can be used to tune a respective antenna. The tuning controller 320 can identify, for each aperture tuner, tuning parameters for a respective tuning configuration for the aperture tuner.

The tuning controller 320 is configured to calculate and compare performance metrics for the antenna under a variety of different tuning configurations. The tuning controller 320 can select a tuning configuration that would cause the antenna 340 to perform the best over a set of candidate tuning configurations, and pass tuning parameters to the aperture tuner 360. The tuning controller 320 can compute a performance metric as a function of the impedance metric, the signal strength metric, and one or more weight values. The weight values can adjust the relative impact, for example, the impedance metric and/or the signal strength metric for a given communication link has on the overall performance metric.

For each of a variety of different tuning configurations, the tuning controller 320 can calculate the corresponding performance metric of the antenna under that configuration, and revert the tuning configuration for the antenna when performance of the antenna is not improved according to the performance metric. The tuning controller 320 can generate a performance metric that takes into account signal strength metrics for multiple communication links, to identify a configuration that overall has the highest performance gain.

A tuning configuration can include a combination of impedance tuner and aperture tuner states. For examples, one state for an impedance tuner can be represented by the codes 10111100 ("BC" when represented in a hexadecimal format) and 11110000 ("F0" when represented in a hexadecimal format) for an impedance tuner and an aperture tuner, respectively. A tuning configuration can be BCF0. Different inductors and capacitors of the aperture and impedance tuners can be connected to an antenna, based on the codes applied. For example, a code of F0 on an aperture tuner can correspond to a 3.1 nH (nanohenry) inductor, while a code of FC can correspond to a 4.7 nH inductor, and so on.

The antenna tuning controller 320 can periodically check whether to tune the antenna according to a new tuning configuration, based on the antenna performance metric of the antenna 340 at a current point in time, and the antenna performance metrics for the antenna 340 tuned according to different candidate tuning configurations. As part of performing an antenna tuning check, the tuning controller 320 can perform the process 400, as described herein with reference to FIG. 4. The tuning controller 320 can be configured to periodically poll the modem 310 for metric data characterizing the antenna 340, and use the metric data to calculate the antenna performance metric for the antenna 340.

For example, an antenna tuning check performed by the antenna tuning controller 320 can occur after a predetermined period of time, or in response to the antenna tuning controller 320 detecting that the current antenna performance metric has fallen below a certain threshold. For example, a tuning check can happen once about every 2.5 seconds. In some examples, the time between tuning checks can increase or decrease based on the antenna performance metric reaching above or below predetermined thresholds. For example, if the tuning controller 320 determines that the antenna performance metric is above a predetermined threshold for performance, the time between antenna checks can increase. Similarly, if the tuning controller 320 determines that the antenna performance metric is below another predetermined threshold for performance, the time between tuning checks can decrease. In some examples, instead of calculating the antenna performance metric, the tuning controller 320 can receive individual metrics, such as impedance or signal strength, and compare those individual metrics against one or more thresholds for determining whether to perform a tuning check.

As another example, in addition or alternatively to the examples herein, the time between tuning checks can be at least partially based on design factors for the host device 100. For example, the frequency at which tuning checks are performed by the tuning controller 320 can vary based on the power consumption to perform the tuning check, and/or to compute the antenna performance metric for the antenna 340 in its current configuration. In some examples, the tuning check can occur about every 2.5 seconds, and reduce to about every 500 milliseconds, for example based on the antenna performance metric. Other design factors can affect the timing between tuning checks, such as battery life and the amount of battery power allocated for performing wireless operations on the host device. These allocations can be predetermined at design time, in some examples.

The antenna performance metric can be expressed as Equation 1, below:

$$\text{antenna performance metric} = w_0(1 - S_{11}*S_{11}) + w_1(\text{RSSI}_1) \qquad (1)$$

where $w_0$ is a weight of the predetermined weights associated with the impedance metric, $S_{11}$ is the reflection coefficient which depends on the impedance of the antenna at the antenna feed, $w_1$ is a weight of the predetermined weights associated with the first link, and $\text{RSSI}_1$ is the signal strength of the communication link.

For each state of the aperture tuner and the impedance tuner, the antenna tuning system can compute the antenna performance metric, and save the highest result. If the highest antenna performance metric is lower than the antenna performance metric of the tuning configuration before iterating through the aperture tuning codes, then the antenna tuning system can revert back to the original tuning configuration.

The antenna tuning system can adaptively update the tuning configuration of the antenna based on multiple communication links with multiple devices. For two communication links, such as a first link between a host device and an earbud, and a second link between the host device and a smartphone, the antenna performance metric can be expressed as Equation 2, as follows:

$$\text{antenna performance metric} = w_0(1 - S_{11}*S_{11}) + w_1(\text{RSSI}_1) + w_2(\text{RSSI}_2) \qquad (2)$$

where $\text{RSSI}_1$ is the signal strength metric for the first communication link, and $\text{RSSI}_2$ is the signal strength metric for the second communication link.

In some examples, the weights $w_1$ and $w_2$ can be predetermined based on a desired prioritization of one communication link over another. For example, the communication link between the host device and earbuds streaming audio may be prioritized over the connection between the host device and a smartphone or mobile device, at least because the communication link of the former is more sensitive to connectivity issues. In some examples, the prioritization can be based on received user input, for example through a user interface on the host device.

In other examples, the values of the predetermined weights can be based on activity along the corresponding communication link whose signal strength metric is measured. For example, the antenna tuning system can determine whether the communication link is "active." An active communication link is actively transmitting data. An "inactive" link is not actively transmitting data. An active communication link can be prioritized over an inactive communication link, for example by changing the weight value of the active link to be higher than the weight of the inactive link.

In other examples, software applications installed on the host device 100, for example, music streaming applications, navigation applications using GPS, or applications controlling different wearable devices connected to the host device, such as a wireless earbud application, can interact with the tuning controller 320 with input to prioritize or deprioritize a respective communication link used by the application.

In prioritizing a certain communication link, the tuning controller 320 can calculate the antenna performance metric with a larger weight value for the signal strength metric corresponding to the communication link. Similarly, in deprioritizing a communication link, the tuning controller 320 can calculate the antenna performance metric with a smaller weight value for the signal strength metric corresponding to the communication link.

In some examples, the weights can be predetermined so as to bring the metrics to a common scale. For example, the reflection coefficient $S_{11}$ may be less than or equal to 1, while different RSSI values for different communication links can vary, for example from 0 to 120 decibels for WiFi-based communication links; −26 to −100 decibels for Bluetooth-based communication links; −44 to −141 decibels for some LTE-based communication links. The tuning controller 320 can calculate the antenna performance metric with weights $w_0$ through $w_n$ that are adjusted in value to compensate for the difference in scale between impedance metric values and signal strength metric values.

Example Methods

Figure 4:
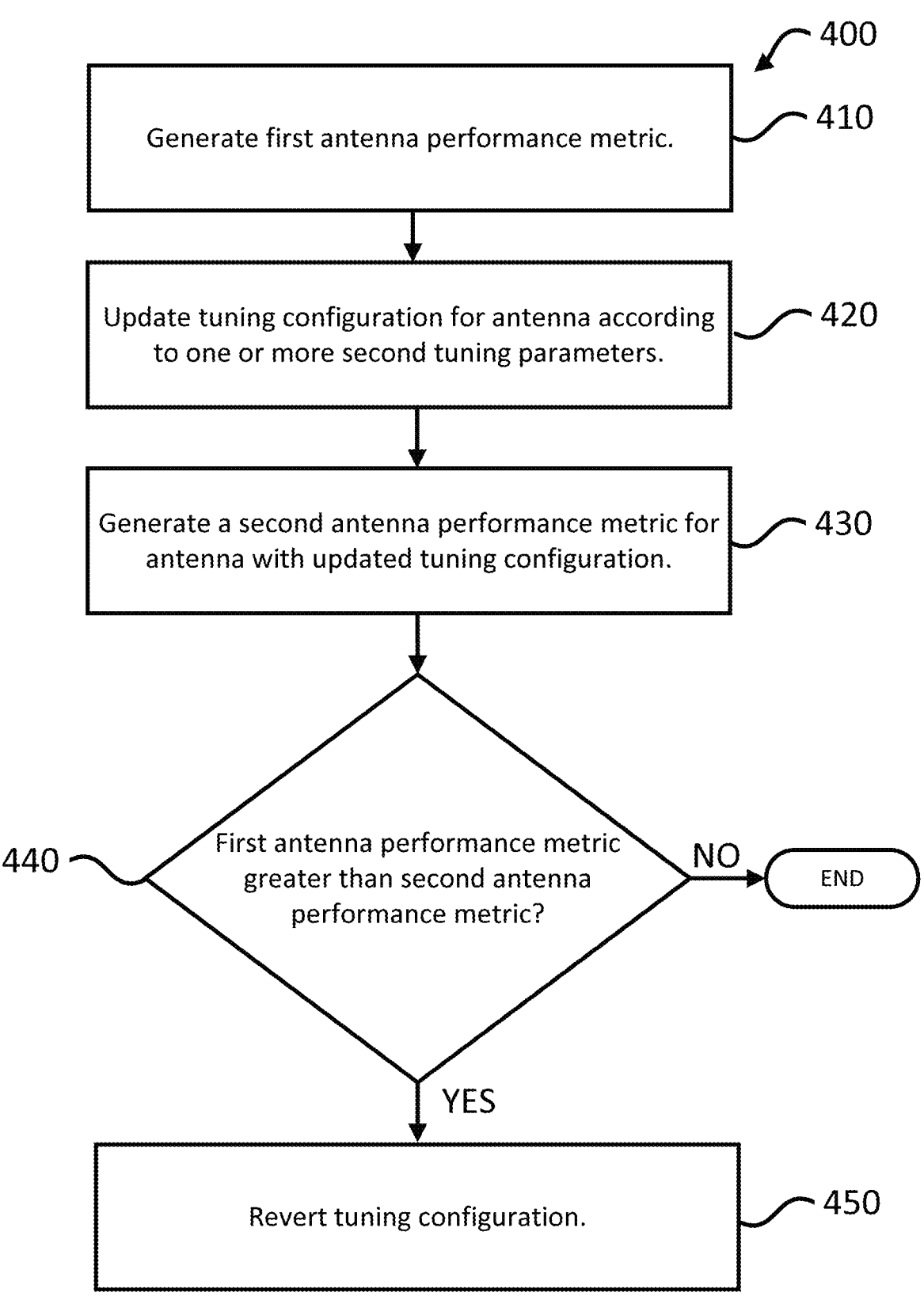
FIG. 4 is a flow chart of an example process for generating an updated tuning configuration, according to aspects of the disclosure.

FIG. 4 is a flow chart of an example process 400 for tuning an antenna, according to aspects of the disclosure.

The antenna tuning system generates a first antenna performance metric, according to block 410. As described herein with reference to FIG. 1, the antenna performance metric can include impedance and signal strength metrics, represented as an $S_{11}$ parameter and RSSI for the antenna and a communication link, respectively. In examples in which the antenna is linked to multiple other antennas of other devices, generating the antenna performance metric can include retrieving the impedance metric for the antenna at the antenna feed, as well as a respective signal strength metric, for example a respective RSSI, for each communication link.

The antenna tuning system updates a tuning configuration for the antenna according to one or more second tuning parameters, according to block 420. As part of updating the tuning configuration, the antenna tuning system can perform the process 500 as described herein with reference to FIG. 5. In performing the process 500, the antenna tuning system can identify an updated tuning configuration, and generate a second antenna performance metric for the antenna with the updated tuning configuration, according to block 430. In some examples, instead of performing the process 500, the antenna tuning system can be configured to randomly generate an updated tuning configuration, and generate the second antenna performance metric from the antenna that has been tuned according to the random updated tuning configuration.

In some examples, the check for more tuning parameters according to block 540 can be performed after outputting the stored metric and tuning parameters, according to block 550. In these examples, outputting stored metric and tuning parameters already identified as greater than a currently stored metric, according to block 520, can provide for an improvement to antenna tuning at reduced latency, at least because the check at block 540 is not performed before outputting the metric and parameters. After outputting the stored metric and tuning parameters according to block 540, the system can then perform the check for more tuning parameters, according to block 550. If the metric for the next tuning parameters is higher than the stored metric, the system can update the and output the metric and tuning parameters, according to blocks 530 and 550. In these examples, successively improved tuning parameters are immediately applied, instead of waiting for the system to iterate through all available tuning parameters before outputting the identified best parameters.

The antenna tuning system determines whether the first antenna performance metric is greater than the second antenna performance metric, according to diamond 440. If the antenna tuning system determines that the first antenna performance metric is not greater than the second antenna performance metric ("NO"), then the process 400 ends.

Because the process 400 ends if the first antenna performance metric is not greater than the second antenna performance metric, then the updated tuning configuration performs the same, if not better, than the first tuning configuration. In addition, as the antenna tuning system updates to the tuning configuration as in block 420, if the updated tuning configuration performs the same or better than the first tuning configuration, then no additional action is needed.

If the antenna tuning system determines that the first antenna performance metric is greater than the second antenna performance metric ("YES"), then the antenna tuning system reverts back to the original tuning configuration, according to block 450. Because the first antenna performance metric is greater, then not reverting from the updating tuning configuration to the first tuning configuration is a direct decrease in performance, and is avoided by reverting back to the first tuning configuration.

Figure 5:
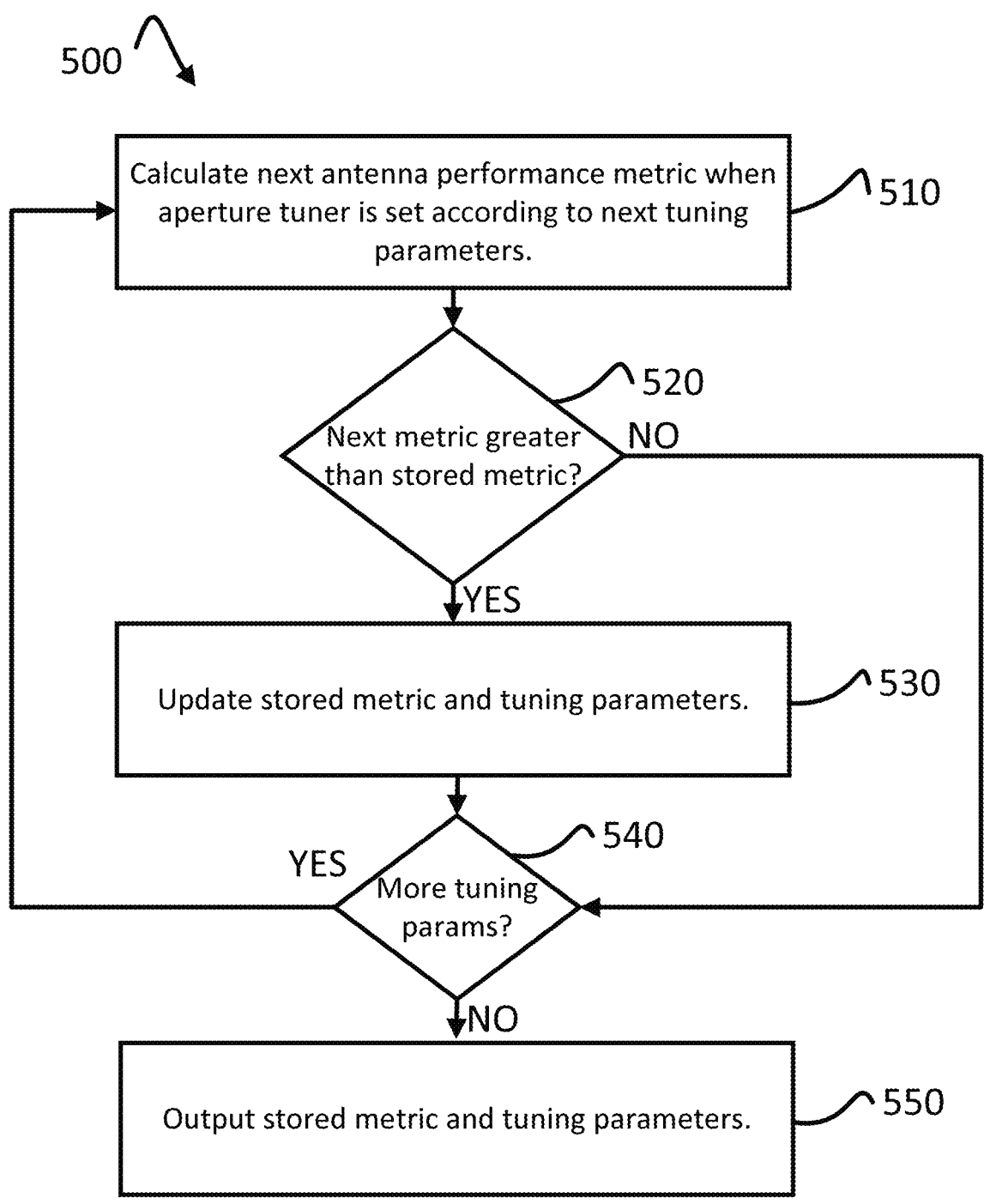
FIG. 5 is a flow chart of an example process for identifying the highest antenna performance metric over a set of tuning configurations for the antenna tuning system, according to aspects of the disclosure.

FIG. 5 is a flow chart of an example process 500 for identifying the highest antenna performance metric over a set of tuning configurations for the antenna tuning system, according to aspects of the disclosure. Some or all of the process 500 can be performed as part of updating the tuning configuration for the antenna, according to block 420.

The antenna tuning system calculates the next antenna performance metric when the aperture tuner is set according to next tuning parameters, according to block 510. The antenna tuning system can iteratively process a set of predetermined tuning parameters for one or both the aperture tuner and the impedance tuner. As described herein with reference to FIGS. 1-3, in some examples the impedance tuner performs a process for matching the impedance of the antenna with the RFFE. In those examples, the antenna tuning system iterates through pairs of tuning parameters, where the impedance tuning parameters are selected based on the matching process performed by the impedance tuner, and the aperture tuning parameters are iterated as part of the process 500.

To calculate the next antenna performance metric corresponding to the next tuning parameters, the antenna tuning system can temporarily tune the antenna according to the next tuning parameters. For example, the tuning controller can provide next aperture tuning parameters to the aperture tuner, and in examples in which the impedance tuner does not perform an automatic matching process, impedance tuning parameters to the impedance tuner. The antenna tuning system maintains the tuning configuration for the antenna using the next tuning parameters long enough to calculate the corresponding antenna performance metric.

In examples in which the antenna tuning system maintains multiple communication links, the tuning parameters include parameters for tuning one or more antennas of the host device for each of the multiple communication links. In some examples, the aperture tuner and impedance tuner are used to tune each antenna, if the host device includes more than one for maintaining each respective communication link.

Also in examples in which the antenna tuning system maintains multiple communication links, the next antenna performance metric is generated using the impedance value of the antenna, and respective signal strength metrics for each communication link, for example the RSSI for each communication link Each signal strength metric can be weighted with a respective weight, to change or modify the impact each signal strength metric has on the overall performance metric.

The antenna tuning system determines whether the next antenna performance metric is higher than the stored antenna performance metric, according to diamond 520. If the antenna system determines that the next antenna performance metric is greater than the stored antenna performance metric ("YES"), then then the antenna tuning system updates the stored antenna performance metric and tuning parameters with the next antenna performance metric and tuning parameters corresponding to the next antenna performance metric, according to block 530.

If the antenna tuning system determines that the next antenna performance metric is not greater than the stored antenna performance metric ("NO"), then the antenna tuning system determines whether there are more tuning parameters to iterate through, according to diamond 540. If the antenna tuning system determines that there are more tuning parameters ("YES"), then the antenna tuning system repeats the steps according to blocks 510, 520, and 530 for the next antenna tuning parameters. If the antenna tuning system determines that there are no additional tuning parameters ("NO"), then the antenna tuning system outputs the currently stored metric and tuning parameters, according to block 550.

Figure 6:
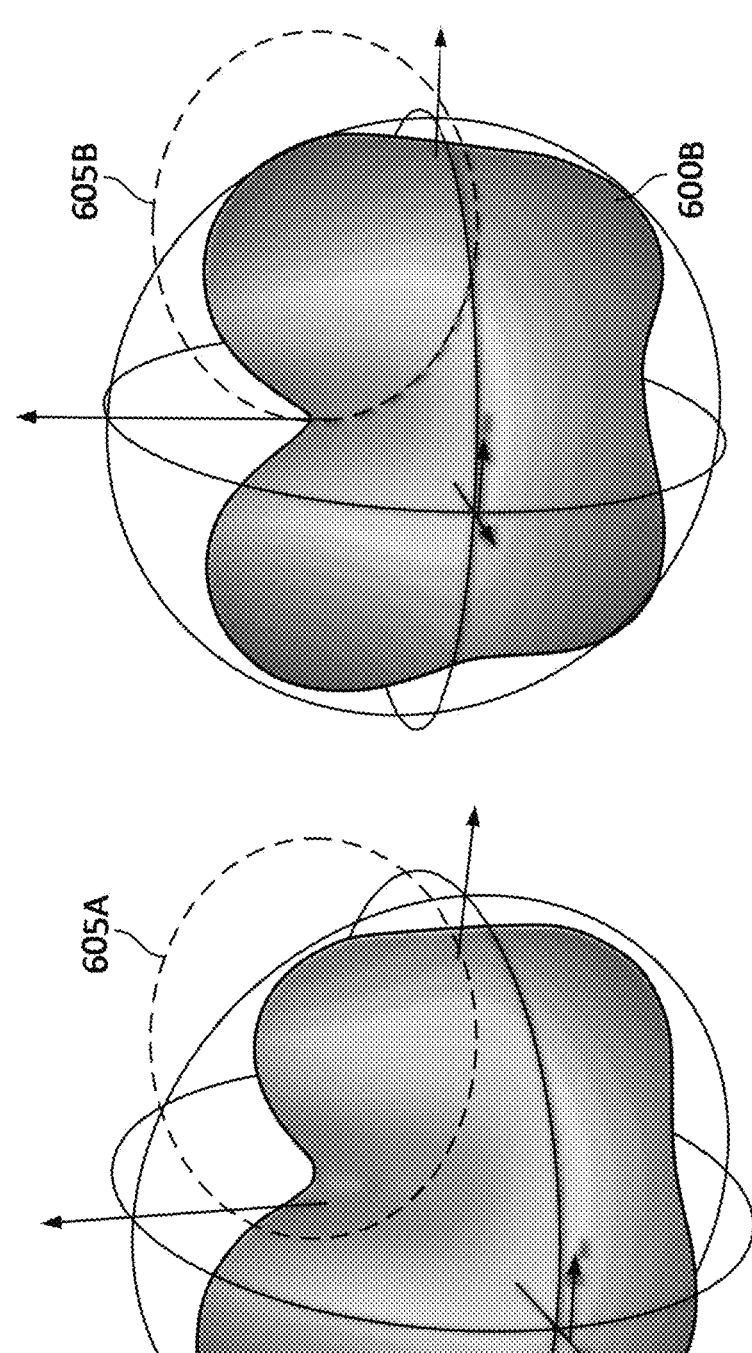
FIG. 6 illustrates a second antenna radiation pattern before and after tuning by the example antenna tuning system.

FIG. 6 illustrates a second antenna radiation pattern before and after tuning by the example antenna tuning system. In some examples, the antenna tuning system can be implemented on a host device independent of design considerations for the type, placement, or size of one or more antennas also implemented on a host device or accessories attached to the host device, such as a case, straps, etc. In other words, a device designer can design a host device according to a variety of different potential configurations, and the antenna tuning system can be implemented independent of those configurations. The antenna tuning system can tune the one or more antennas regardless of whether the antennas were implemented with the antenna tuning system in mind.

For the same antenna, the tuning system supports multiple radiation patterns such as radiation patterns 600A and 600B. 600A has null directions, e.g. null zones pointed towards a computing device in communication with the device implementing an antenna tuning system. Communication with devices in these directions is limited. The antenna tuning system as described herein calculates the antenna performance metric and switches a host device implementing the system to the radiation pattern 600B, maintaining a desired antenna impedance by changing the tuning configuration and overcoming the limitations of radiation pattern 600A. The antenna tuning system overcomes the performance limitations of the radiation pattern 600A by adjusting for the impedance value of the feed of the antenna and the signal strength of a communication link simultaneously. The antenna tuning system as described herein identifies a tuning configuration to change the radiation pattern emanating from a tuned antenna, for example from having a region 605A with a null zone ro having a region 605B with a reduced or eliminated null zone pointed towards a secondary computing device.

Figure 7:
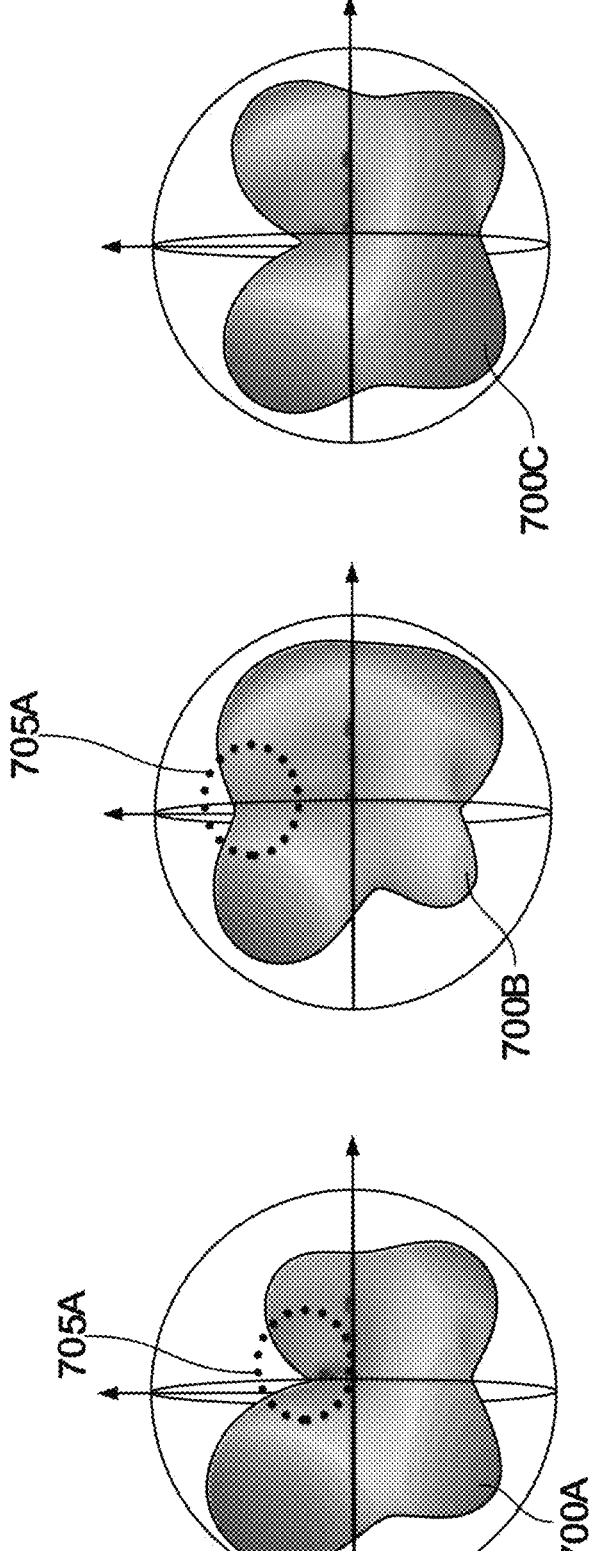
FIG. 7 illustrates example antenna radiation patterns before and after tuning by the example antenna tuning system.

FIG. 7 illustrates example antenna radiation patterns 700A-C according to various aperture tuner configurations. An aperture tuner can have an inductor or capacitor bank facilitating many states for the aperture tuner. For example the aperture of the aperture tuner can be open. The radiation pattern 700A can correspond to the aperture being open. For example the code 1111010 ("FA" when converted to a hexadecimal format) can correspond to a 7 nH (nanohenry) inductor in the aperture tuner connected to the antenna.

Radiation pattern 700B can correspond to the aperture tuner being set to the example code corresponding to 7 nH. As another example, the code 00001010 ("0A" in hexadecimal) can correspond to a 3.5 pF (picofarad) capacitor connected to the antenna using switches inside the aperture tuner. Radiation pattern 700C can correspond to the aperture tuner being set to the example code corresponding to 3.5 pF. The antenna tuning system as described herein can iterate through a variety of tuning codes as part of identifying an improved performance metric. In some examples, region 705A shows a change from radiation pattern 700A to radiation pattern 700B, for example when the antenna corresponding to the radiation pattern 700A is tuned according to a different tuning configuration. The region 705A changes, for example to improve the communication link to a device in the direction of the region 705A.

Aspects of this disclosure can be implemented in digital circuits, computer-readable storage media, as one or more computer programs, or a combination of one or more of the foregoing. The computer-readable storage media can be non-transitory, for example as one or more instructions executable by a computing device hosting an antenna tuning system and stored on a tangible storage device, according to aspects of the disclosure.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. An antenna tuning system, comprising:
one or more aperture tuners; and
one or more processors configured to:
generate a first antenna performance metric for a communication link between an antenna and a first device when the antenna is tuned according to one or more first tuning parameters, the first antenna performance metric based on an impedance metric for the antenna and a signal strength metric for the communication link, wherein the impedance metric is a measured parameter representing a reflection coefficient;
update a tuning configuration for the antenna according to one or more second tuning parameters by providing the one or more second tuning parameters to the one or more aperture tuners;
generate a second antenna performance metric for the communication link based on the impedance metric for the antenna and the signal strength metric for the communication link when the antenna is tuned according to the updated tuning configuration using the one or more aperture tuners;
determine whether the first antenna performance metric is higher than the second antenna performance metric; and
revert, in response to determining that the first antenna performance metric is higher than the second antenna performance metric, the tuning configuration for the antenna according to the one or more first tuning parameters;
wherein, in generating the first and second antenna performance metrics, the one or more processors are configured to respectively compute the first and second antenna performance metrics based on a sum of weighted values for the impedance metric and the signal strength metric that are weighted according to predetermined weights.

2. The antenna tuning system of claim 1, wherein updating the tuning configuration for the antenna comprises selecting one of two or more different predetermined candidate tuning configurations.

3. The antenna tuning system of claim 1, wherein:
the antenna tuning system further comprises an impedance tuner; and
in generating the second antenna performance metric for the communication link, the one or more processors are configured to generate the second antenna performance metric for the communication link when the antenna is tuned according to the updated tuning configuration using the one or more aperture tuners and the impedance tuner.

4. The antenna tuning system of claim 3, wherein, in updating the tuning configuration for the antenna, the one or more processors are configured to provide one or more tuning parameters to both the one or more aperture tuners and the impedance tuner.

5. The antenna tuning system of claim 1, wherein:
the communication link is a first communication link;
the antenna is configured to communicate with each of one or more second devices through a respective second communication link; and
in computing the first antenna performance metric, the one or more processors are configured to compute the first antenna performance metric further based on additional signal strength metrics each characterizing the signal strength of a respective second communication link weighted by a respective predetermined weight of the predetermined weights.

6. The antenna tuning system of claim 5, wherein the impedance metric is based on an $S_{11}$ parameter for the antenna and the signal strength metric is based on a received signal strength indicator (RSSI) of the communication link.

7. The antenna tuning system of claim 6, wherein:
the antenna is connected to an antenna feed; and
in generating the first antenna performance metric, the one or more processors are configured to compute the first antenna performance metric in accordance with:

$$w_0(1-S_{11}*S_{11})+w_1(RSSI_1)$$

where $w_0$ is a weight of the predetermined weights associated with the impedance metric, $S_{11}$ is a reflection coefficient which depends on the impedance of the antenna at the antenna feed, $w_1$ is a weight of the predetermined weights associated with the first signal, and $RSSI_1$ is the signal strength of the communication link.

8. The antenna tuning system of claim 7, wherein, in updating the tuning configuration, the one or more processors are configured to perform one or more iterations of:
updating the tuning configuration of the antenna using respective one or more tuning parameters of a plurality of tuning parameters applied to the one or more aperture tuners, an impedance tuner, or the one or more aperture tuners and the impedance tuner;
generating a respective antenna performance metric when the tuning configuration is updated according to the respective one or more tuning parameters;
determining that the respective antenna performance metric is the highest antenna performance metric identified from the one or more iterations; and
in response, generating the respective antenna performance metric as the second antenna performance metric and updating the tuning configuration according to the respective one or more tuning parameters for the highest antenna performance metric.

9. The antenna tuning system of claim 7, wherein, in generating the second antenna performance metric, the one or more processors are configured to adjust the value of a predetermined weight based on whether a communication link corresponding to the signal strength value weighted by the predetermined weight is active or inactive.

10. The antenna tuning system of claim 5, wherein the one or more processors are configured to:
receive input indicating that at least one of the first communication link and the second communication link are to be prioritized over other communication links, and
adjust the predetermined weights in accordance with the received input.

11. The antenna tuning system of claim 1, wherein, in updating the tuning configuration, the one or more processors are configured to adjust both the impedance and a radiation pattern for the antenna.

12. The antenna tuning system of claim 1, wherein:
the antenna tuning system further comprises an antenna tuning controller; and
the one or more processors are configured to update a tuning configuration in response to a tuning check performed by the antenna tuning controller after a predetermined period of time and/or in response to the antenna tuning controller detecting that the first antenna performance metric has fallen below a threshold.

13. The antenna tuning system of claim 12, wherein the one or more processors are configured to change a time between subsequent tuning checks based on the first antenna performance metric.

14. The antenna tuning system of claim 13, wherein the one or more processors are configured to increase or decrease the time between subsequent tuning checks based on the first antenna performance metric reaching above or below a predetermined threshold.

15. A method for tuning an antenna, comprising:
generating, by one or more processors, a first antenna performance metric for a communication link between an antenna and a first device when the antenna is tuned according to one or more first tuning parameters, the first antenna performance metric based on an impedance metric for the antenna and a signal strength metric for the communication link, wherein the impedance metric is a measured parameter representing a reflection coefficient;
updating, by one or more processors, a tuning configuration for the antenna according to one or more second tuning parameters by providing the one or more second tuning parameters to one or more aperture tuners;
generating, by one or more processors, a second antenna performance metric for the communication link based on an impedance metric for the antenna and a signal strength metric for the communication link when the antenna is tuned according to the updated tuning configuration;
determining, by one or more processors, whether the first antenna performance metric is higher than the second antenna performance metric; and
reverting, by the one or more processors in response to determining that the first antenna performance metric is higher than the second antenna performance metric, the tuning configuration for the antenna according to the one or more first tuning parameters;
wherein, in generating the first and second antenna performance metrics, the first and second antenna performance metrics are respectively computed based on a sum of weighted values for the impedance metric and the signal strength metric that are weighted according to predetermined weights.

16. The method of claim 15, wherein updating the tuning configuration for the antenna comprises selecting one of two or more different predetermined candidate tuning configurations.

17. The method of claim 15, wherein:
the communication link is a first communication link;
the antenna communicates with each of one or more second devices through a respective second communication link; and
computing the first antenna performance metric comprises computing the first antenna performance metric further based on additional signal strength metrics each characterizing the signal strength of a respective second communication link weighted by a respective predetermined weight of the predetermined weights.

18. The method of claim 15, wherein the impedance metric is based on an $S_{11}$ parameter for the antenna and the signal strength metric is based on a received signal strength indicator (RSSI) of the communication link.

19. The method of claim 18, wherein:

the antenna is connected to an antenna feed; and generating the first antenna performance metric comprises computing the first antenna performance metric in accordance with:

$$w_0(1-S_{11}*S_{11})+w_1(RSSI_1)$$

where $w_0$ is a weight of the predetermined weights associated with the impedance metric, $S_{11}$ is a reflection coefficient which depends on the impedance of the antenna at the antenna feed, $w_1$ is a weight of the predetermined weights associated with the first signal, and $RSSI_1$ is the signal strength of the communication link.

20. The method of claim 19, wherein:

the one or more processors are coupled to one or more aperture tuners and one or more impedance tuners at the antenna feed; and updating the tuning configuration comprises performing one or more iterations of:

updating the tuning configuration of the antenna using respective one or more tuning parameters of a plurality of tuning parameters applied to the one or more aperture tuners, the one or more impedance tuners, or both the one or more aperture tuners and the one or more impedance tuners;

generating a respective antenna performance metric when the tuning configuration is updated according to the respective one or more tuning parameters;

determining that the respective antenna performance metric is the highest antenna performance metric identified from the one or more iterations; and in response, generating the respective antenna performance metric as the second antenna performance metric and updating the tuning configuration according to the respective one or more tuning parameters for the highest antenna performance metric.

21. The method of claim 19, wherein generating the second antenna performance metric comprises adjusting the value of a predetermined weight based on whether a communication link corresponding to the signal strength value weighted by the predetermined weight is active or inactive.

22. The method of claim 15, wherein updating the tuning configuration comprises adjusting both an impedance and a radiation pattern for the antenna.

23. The method of claim 15, further comprising updating a tuning configuration in response to a tuning check performed after a predetermined period of time and/or in response to detecting that the first antenna performance metric has fallen below a threshold.

24. The method of claim 23, further comprising changing a time between subsequent tuning checks based on the first antenna performance metric.

25. The method of claim 24, further comprising increasing or decreasing the time between subsequent tuning checks based on the first antenna performance metric reaching above or below a predetermined threshold.

26. A wearable device, comprising:

an impedance tuner;

an aperture tuner;

an antenna; and one or more processors configured to:

generate a first antenna performance metric for a communication link between an antenna and a first device when the antenna is tuned according to one or more first tuning parameters, the first antenna performance metric based on an impedance metric for the antenna and a signal strength metric for the communication link, wherein the impedance metric is a measured parameter representing a reflection coefficient;

update a tuning configuration for the antenna according to one or more second tuning parameters by providing the one or more second tuning parameters to the one or more aperture tuners;

generate a second antenna performance metric for the communication link based on an impedance metric for the antenna and a signal strength metric for the communication link when the antenna is tuned according to the updated tuning configuration;

determine whether the first antenna performance metric is higher than the second antenna performance metric; and revert, in response to determining that the first antenna performance metric is higher than the second antenna performance metric, the tuning configuration for the antenna according to the one or more first tuning parameters;

wherein, in generating the first and second antenna performance metrics, the one or more processors are configured to respectively compute the first and second antenna performance metrics based on a sum of weighted values for the impedance metric and the signal strength metric that are weighted according to predetermined weights.

* * * * *